Jan. 28, 1947.　　A. A. GRADISAR ET AL　　2,414,867
PROJECTION APPARATUS
Filed June 25, 1942　　4 Sheets-Sheet 1

INVENTOR.
ALBIN A. GRADISAR
BY GUSTAV E. GUELICH
ATTORNEY

Jan. 28, 1947.  A. A. GRADISAR ET AL  2,414,867
PROJECTION APPARATUS
Filed June 25, 1942  4 Sheets-Sheet 2

INVENTOR.
ALBIN A. GRADISAR
GUSTAV E. GUELLICH
BY
ATTORNEY

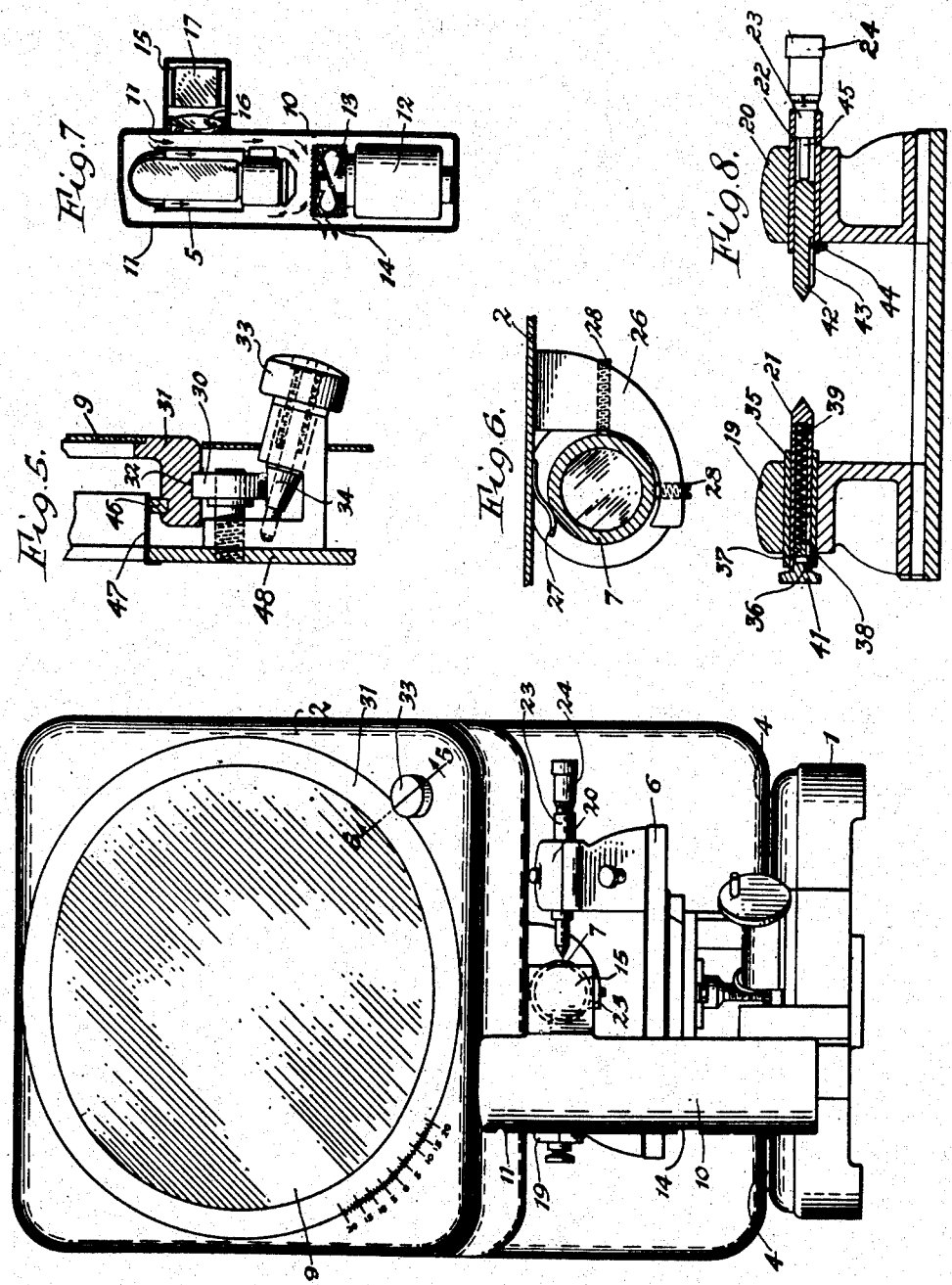

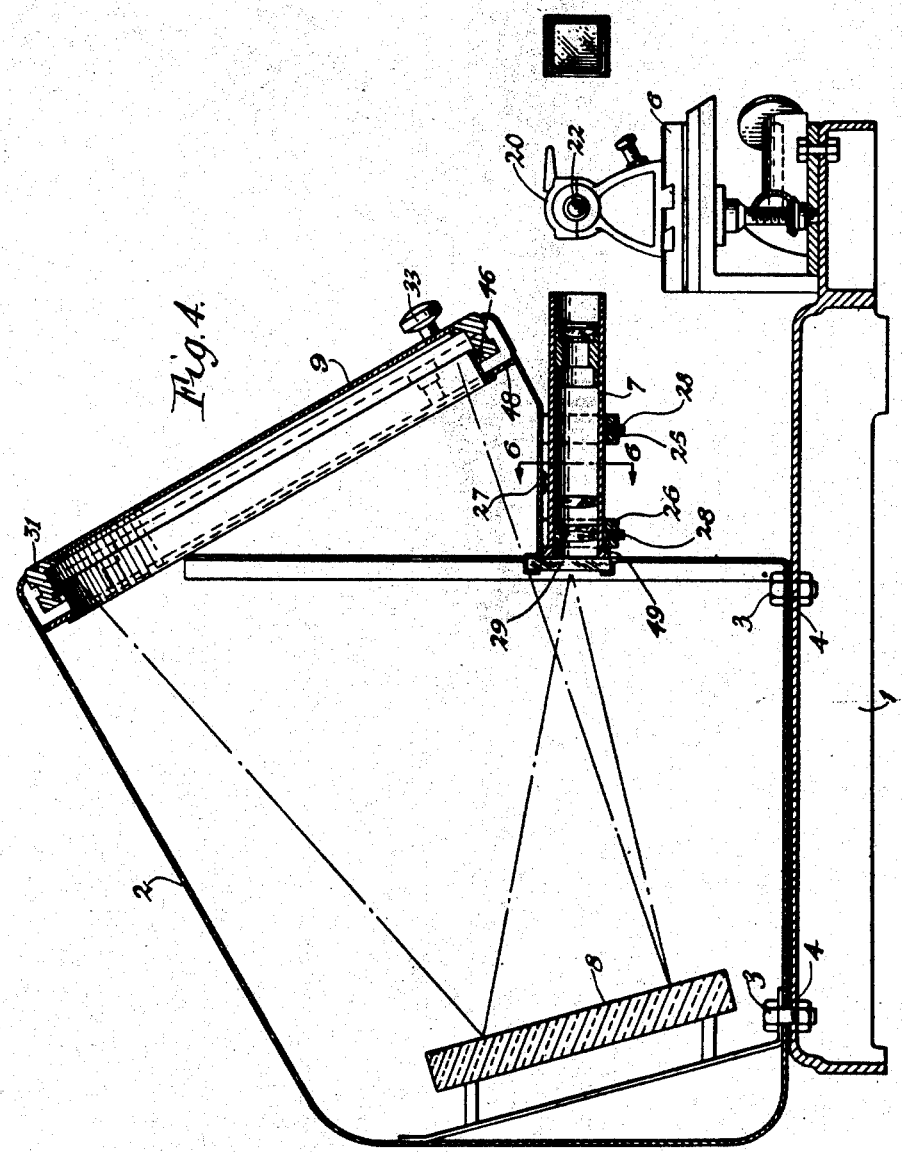

Patented Jan. 28, 1947

2,414,867

UNITED STATES PATENT OFFICE 2,414,867

PROJECTION APPARATUS

Albin A. Gradisar and Gustav E. Guellich, Buffalo, N. Y., assignors, by mesne assignments, to American Optical Company, Southbridge, Mass., a voluntary association Application June 25, 1942, Serial No. 448,512

1 Claim. (Cl. 88—24)

This invention relates to projection apparatus and has particular reference to improvements in apparatus for projecting the contour or outline of objects on to a screen where they can be measured or compared with standards or the like.

An object of the invention is to provide improvement in apparatus for projecting the contour of an object on to a screen for measurement or comparison.

Another object of the invention is to provide a device of the type set forth with new and improved means for removably holding the image forming system in definite predetermined relation to the optical axis of the illuminating beam as well as to the reflector and screen.

Another object of the invention is to provide a device of the type set forth with new and improved means for adjusting the screen.

Another object is to provide a device of the type set forth with means to seal the same against oil vapors, dust, etc. to prevent the reflecting surface and surfaces of the optical members from becoming fogged or dirty.

Other objects and advantages of the invention will be apparent from the following description taken in connection with the accompanying drawings. It will be understood that many changes may be made in the details of construction and arrangement of parts without departing from the spirit of the invention as expressed in the accompanying claim. We therefore do not wish to be limited to the exact details of construction and arrangement of parts shown and described as the preferred form has been shown by way of illustration only.

Referring to the drawings:

Fig. 3 is a front view thereof.

Fig. 4 is a sectional view taken on line 4—4 of Fig. 2 looking in the direction of the arrows.

Fig. 5 is a fragmentary sectional view taken on line 5—5 of Fig. 3 looking in the direction of the arrows.

Fig. 6 is a sectional view taken on line 6—6 of Fig. 4 looking in the direction of the arrows.

Fig. 7 is a sectional view taken on line 7—7 of Fig. 1 looking in the direction of the arrows; and Fig. 8 is a sectional view taken on line 8—8 of Fig. 2.

Figure 1:
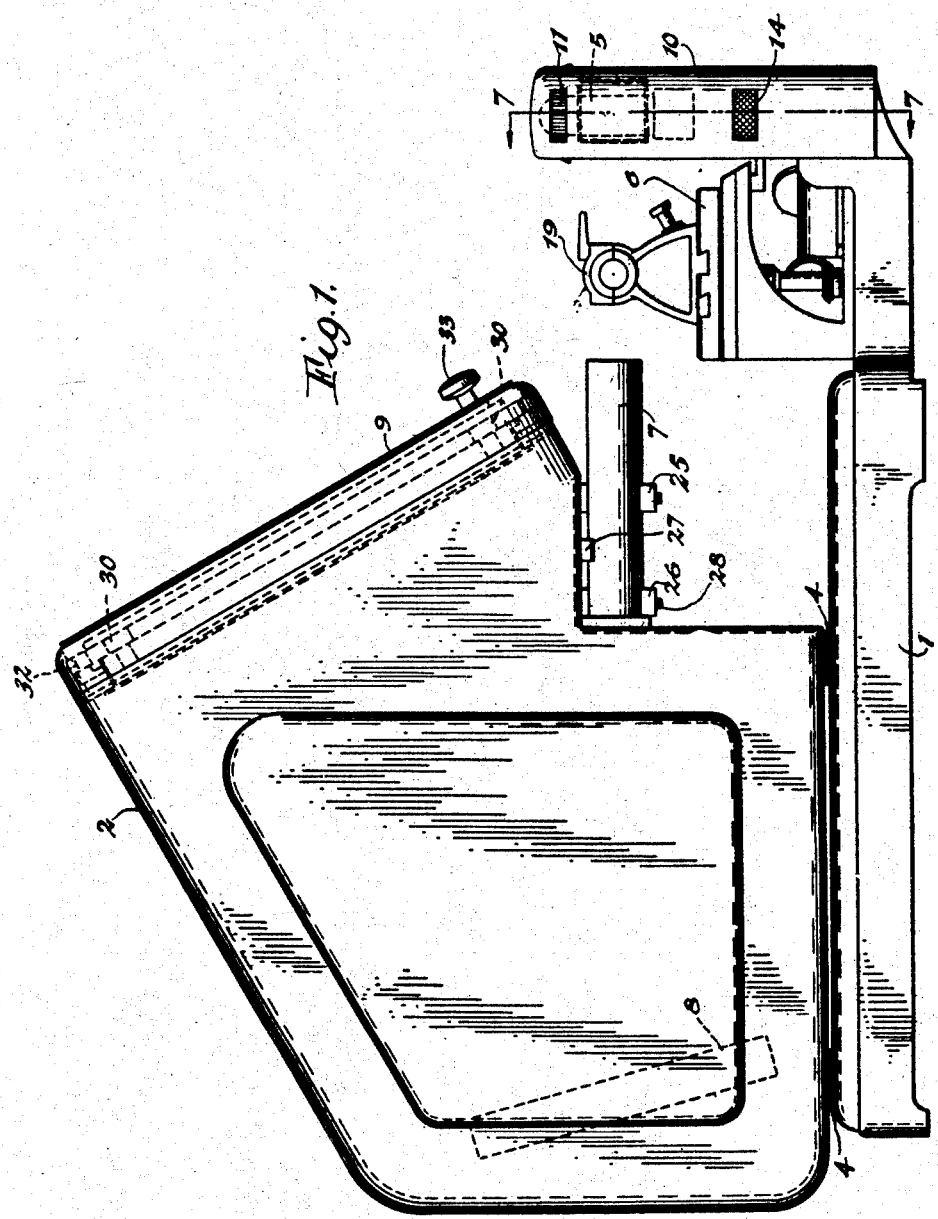
Fig. 1 is a side view of a projection apparatus embodying our invention.
Figure 2:
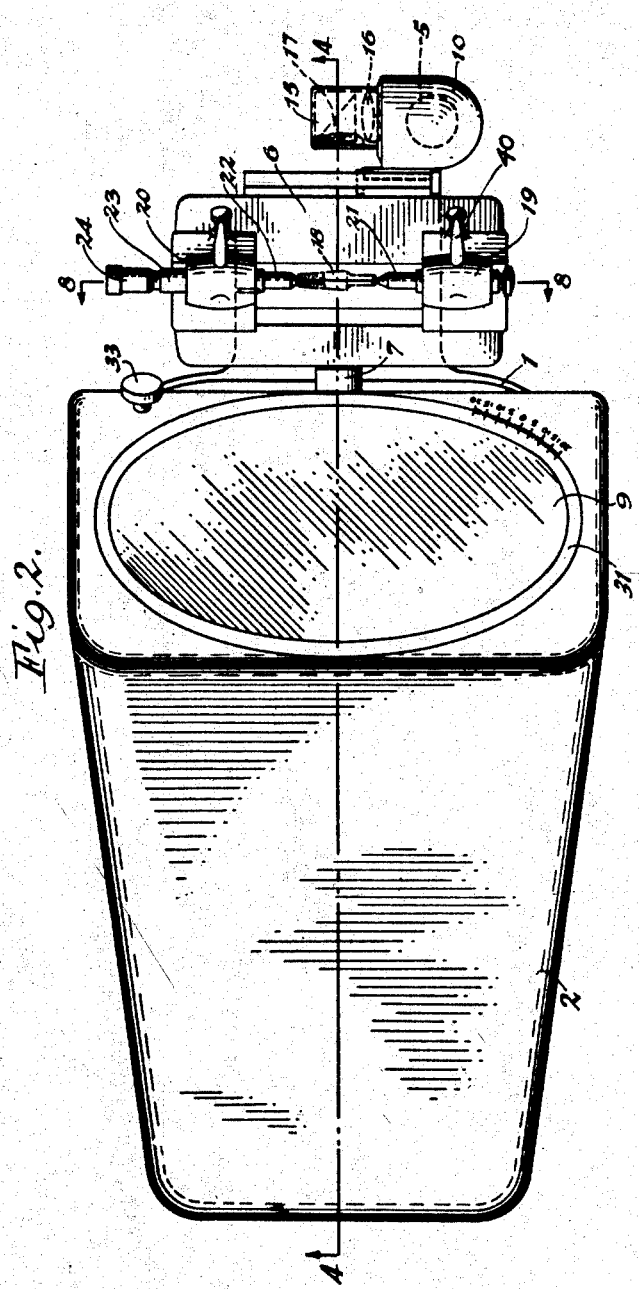
Fig. 2 is a top or plan view thereof.

Referring more particularly to the drawings:

The instrument comprises a base or support 1 on which is secured a housing 2 by means of the bolts or the like 3. It is pointed out that the housing 2 contacts the base 1 in only three points 4 at which points the housing 2 is secured to said base 1 by said bolts or the like 3. Thus the base 1 and housing 2 are separate units and the base 1 and housing 2 may be easily separated for use of the housing on other type bases.

The projection apparatus comprises essentially a source of illumination 5, a work holder 6, the image forming system 7, reflector 8 and screen 9.

The lamp 5 is positioned in a lamp housing 10 which lamp housing 10 is detachably connected at its lower end to the forward end of the base 1 and said lamp house 10 has louvers 11 adjacent the upper end thereof and is provided with the motor 12 and suction fan 13 adapted to cause air to enter said lamp house 10 through said louvers 11 and which air is exhausted from the lamp house through the louver 14. This construction provides a constant flow of air through the lamp house and forces the heated air out of the lamp house through the lower portion thereof thus ventilating and cooling said lamp house.

If desired a reflector may be positioned behind the lamp 5 to increase the illumination. On the lamp house 10 is the projecting portion 15 containing the condenser lens system 16 and prism or other reflector 17 adapted to reflect light from the lamp 5 across the work holder 6 through the image forming system 7 whereupon the image of the work on the work holder 6 is projected onto the reflector 8 from which it is reflected onto the translucent screen 9.

The work holder shown is adapted for supporting threaded objects such as the tap 18 and said work holder comprises the center supports 19 and 20 supporting the centers 21 and 22. The center support 21 is spring loaded and the center 22 is adapted to be actuated by the micrometer screw member 23 which is provided with the micrometer drum 24.

The spring loaded tail center comprises the sleeve 35 which is clamped in the support 19 by means of the handle 40 and in said sleeve 35 is positioned the tail center 21 slidably mounted but restricted against turning by pin 36 which is pressed or threaded into sleeve 35, passes through slot 38 in tail center 21 and backs up floating plug 37 which engages one end of the coil spring 39 which spring is positioned in the hollow bore of the tail center 21 and supplies relatively uniform pressure on the tail center 21.

The handle 41 acts as a stop for tail center 21 in the position shown in Fig. 8 and provides means for operating the said tail center to allow insertion or removal of the work.

The measuring center consists of sleeve 22 which is clamped in support 20 and in said sleeve 22 is positioned the center 42 which is slidably mounted in said sleeve 22 but restricted against rotation by means of the pilot screw 44 operating in slot 43. This slot 43 and screw 44 also limit the travel of the center 42.

Adjacent the opposite end of the sleeve 22 is positioned the micrometer screw 24 which has the extension 45 engaging the end of said center 42 and adapted to accurately measure the travel of said center 42.

The rotation of the centers 21 and 42 is prevented because the objects frequently held by these centers are threaded and it is important that such objects do not rotate while the pitch of the thread is being measured.

The image forming system 7 is adapted to be positioned on the arms 25 and 26 and held thereon by the spring member 27. To align the axis of said image forming system 7 the arms 25 and 26 are provided with the screw members 27 and 28.

The flange 49 on the end of the objective tube 7, and adjacent the window 29 locates the whole objective axially on the optical axis so as to produce a predetermined magnification on the screen when the work in the object holder is in sharp focus on the screen. This flange 49 may be rigidly located in an opening or slot or in engagement with a resilient member on the frame 2, adjacent the window 29, or on the support 26.

The housing 2 is provided with an opening in which is positioned a window 29 aligned with said image forming system 7. This window 29 allows the entrance of the projected image into the housing 2 while preventing the entrance of oil, vapor, dust, etc. therein.

To rotate the ground glass screen 9 a friction drive is provided. This friction drive comprises a plurality of spaced rollers 30 adjacent the periphery of the support 31 for said ground glass screen 9 with said rollers adapted to ride in a slot or groove 32 in the periphery of said support 31. Adjacent one of said rollers 30 is provided the driving member having the knob 33 and the tapered surface 34 adapted to frictionally engage the roller member 30 which in turn frictionally engages the screen support 31 so that rotation of said knob 33 will cause simultaneous rotation of the support 31 and ground glass screen 9.

It is pointed out that with the construction described above that the rotation of the knob 33 and screen 9 will always be in the same direction, that is, a clockwise rotation of the knob 33 will produce a clockwise rotation but to a reduced degree of the screen 9 and vice versa.

To seal the hood against oil vapors, dust, etc. we provide a resilient washer member 46 which is secured in a slot in ring 31 and resiliently and slidably engages the surface of the flange 47 on the partition 48 of the casing 2.

From the foregoing it will be seen that we have provided simple, efficient and economical means for obtaining all of the objects and advantages of the invention.

Having described our invention we claim:

In a contour projector, in combination with an optical projecting system including an objective tube, a cabinet, a reflector within the cabinet, said cabinet being completely enclosed except for a projection opening and a screen opening formed in wall portions thereof, said objective tube being removably supported by said cabinet so as to normally close said projection opening, a circular screen overlying said screen opening and rotatably supported on said cabinet, said openings and reflector being arranged to permit an image received by said reflector from said optical projecting system by way of said projection opening to be reflected by said reflector to said screen overlying said screen opening, and means for preventing vapors, dust or the like from entering said openings and reaching the reflector positioned within the cabinet, said means including an annular flange on said rotatable screen and a resilient ring between and cooperating with said cabinet and flange and completely sealing the annular space therebetween, and a transparent window aligned with said removable objective tube and permanently sealing said projection opening.

ALBIN A. GRADISAR.
GUSTAV E. GUELLICH.